Feb. 26, 1946. A. WINTHER 2,395,772
ELECTROMAGNETIC FRICTION CONTROL DEVICE
Filed Jan. 27, 1945   2 Sheets-Sheet 1

Anthony Winther, Inventor.
Haynes and Koenig, Attorneys.

Feb. 26, 1946.    A. WINTHER    2,395,772
ELECTROMAGNETIC FRICTION CONTROL DEVICE
Filed Jan. 27, 1945    2 Sheets-Sheet 2

Patented Feb. 26, 1946

2,395,772

UNITED STATES PATENT OFFICE 2,395,772

ELECTROMAGNETIC FRICTION CONTROL DEVICE

Anthony Winther, Kenosha, Wis., assignor to Martin P. Winther, trustee

Application January 27, 1945, Serial No. 574,881

16 Claims. (Cl. 192—84)

This invention relates to electromagnetic friction control devices, and with regard to certain more specific features to electromagnetic friction clutches, brakes and the like having modulated control means.

Among the several objects of the invention may be noted the provision of modulating means for electromagnetic clutches, brakes and the like, which through the use of simple and reliable means preserves a long range of friction modulation after initial closure of the apparatus; the provision of apparatus of the class described which eliminates parasitic frictional drag under open or released conditions; the provision of apparatus of the class described in which proper timing between open-gap closure and modulation is inherent; and the provision of apparatus of this class in which contact arcing is inherently minimized. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention:

Similar reference characters indicate corresponding parts throughout the several views of the drawings.

Figure 1:
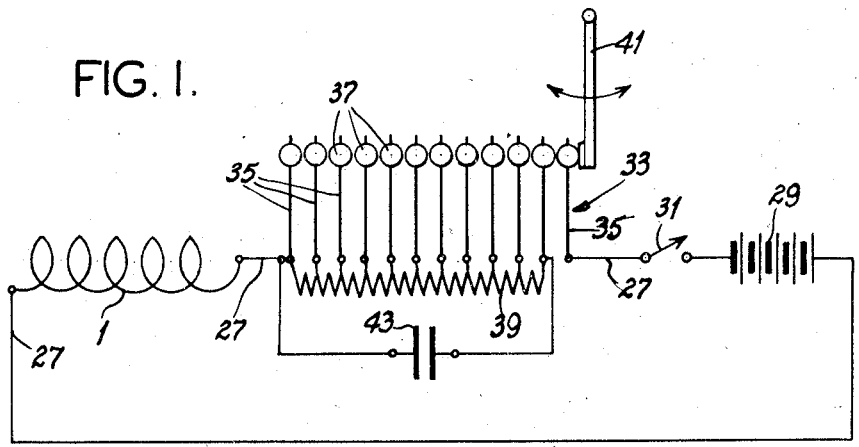
Fig. 1 is a schematic wiring diagram.
Figure 2:
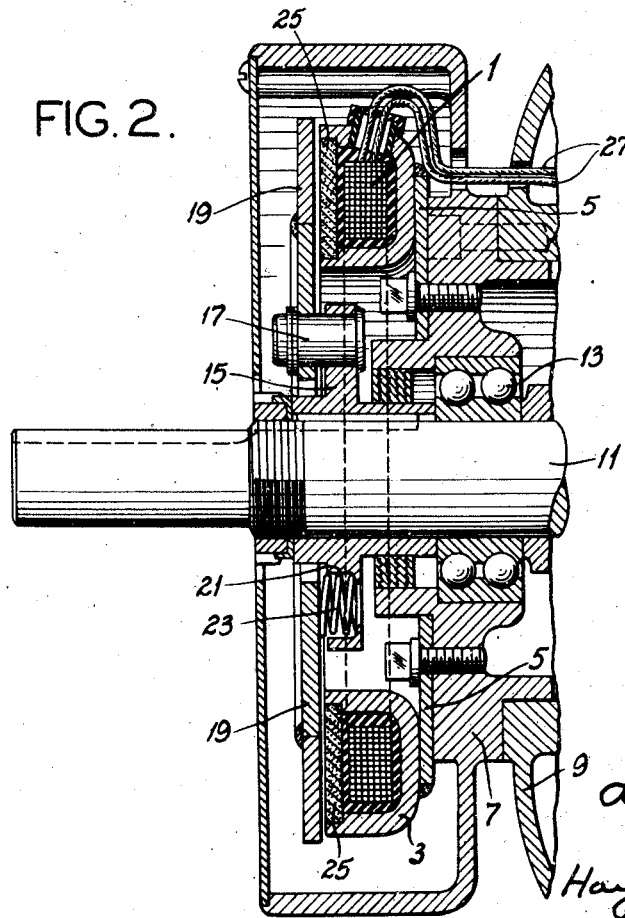
Fig. 2 is a vertical section showing application of the invention to a mechanical friction brake; and, Fig. 3 is a view similar to Fig. 2 but showing the application of the invention to a mechanical friction clutch.

Referring now more particularly to Figs. 1 and 2, numeral 1 indicates an electromagnetic coil of circular form which is suitably insulated and nested in a magnetic torus 3, which is fixedly supported upon a ring 5, the latter being attached to a stationary frame 7. For example, frame 7 constitutes a fixed extension from a motor housing 9. The armature shaft 11 of the motor is that which it is desired to brake. It is supported on suitable bearings 13, and toward its outer end has keyed thereto a spider 15. This spider has a suitable number of supporting pins 17 (three, for example), only one of which is shown in the plane of the section. The pins slidably support a brake disc 19 which may freely move axially on the pins.

The spider 15 also carries a plurality of sockets 21 for compression springs 23 which normally bias the brake disc 19 away from the torus 3. There are a number of the sockets 21 and springs 23, only one of each of which is shown in the plane of the section. Peripherally considered, the springs 23 and pins 17 are in alternate positions.

The part of the magnetic torus 3 which is adjacent to the magnetic brake disc 19 is provided with a non-magnetic frictional insert ring 25 adapted to be engaged by the brake disc 19 when the latter is drawn toward the torus 3 by means of the toric flux field which is generated from the coil 1 when the latter is electrically energized. The attractive magnetic circuit closes through torus 3 and the disc 19.

Heretofore, so-called electric or magnetic brakes and clutches have been subject to the disadvantage that a substantial amount of magnetic field intensity was necessary in the released condition of the brake or clutch to draw the armature across any air gap employed. Since the air gap would then decrease quickly to zero, the closing force would rise rapidly to a point far beyond that desirable for a gradually modulated closure. Thus, besides too rapidly closing the brake or clutch for smooth action, very little modulating range was left for friction control after closure.

One solution attempted was lightly to press the brake or clutch disc or armature against the field member such as 3. This entirely and permanently eliminated the air gap and allowed complete modulation but at the disadvantage of having a permanent parasitic frictional drag which is intolerable for some service.

Another attempted solution to the problem was to allow an initial air gap and initially to magnetize the coil under short-circuit conditions. The disadvantage of this scheme was the excessive contact arcing and the niceties of mechanical coordination that were required for timing the relaxation of the short-circuiting effect. The present invention eliminates all difficulties of the above nature.

Referring to Fig. 1, numeral 27 indicates a circuit feeding the field coil 1. In this circuit is the supply battery 29 and a master switch 31. At numeral 33 is shown in general a contact bank or rheostat consisting of a series of spring leaves 35 upon which are mounted contact buttons 37 spaced slightly apart under normal conditions. Contacts 37 and the leaves 35 are conductors, the latter being connected at intervals to a resistance bank 39. The last leaf 35 at the right does not connect into the bank 35 but is connected directly into the circuit 27. A swinging control bar is shown at 41, which is adapted to press the endmost one of the contacts 37. This closes the circuit into the coil 1 and then sequentially closes the contacts that short out increasing amounts of the resistance 39. This provides modulation of the brake closing force by modulating the field in coil 1. Details of an exemplary mechanical form of a contact bank such as 35, 37, 39 is shown in my United States Patent 2,050,479, dated August 11, 1936. It is to be understood that other rheostat modulating means may be used for gradually cutting resistance into or out of circuit, the one described being exemplary. In parallel with the complete resistance bank 39 is connected a condenser 43. This is an important point of novelty herein.

Operation is as follows, referring to Figs. 1 and 2:

Normally the brake plate and armature 19 is lightly pressed away from the field member 3 to provide the air gap shown. It is preferable that the springs 23 in Fig. 2 and 63 in Fig. 3 have high deflection characteristics, that is, for relatively small increases of applied pressure they should deflect relatively large amounts. That is to say, their unit deflection should be large. These are generally called weak springs.

Assume that the switch 31 is closed. Then by moving the modulator lever 41 clockwise, the first pair of contacts to close will apply voltage from the battery 29 across the total resistance 39. This instantly charges the condenser 43 and causes an instantaneous rush of current through the coil 1. This promptly draws the armature 19 across the air gap and against the field member 3, including contact with the frictional surface 25. Practically at the instant that the armature has closed the gap and is against the field member, the condenser 43 becomes fully charged and the flow of current dies out, this action being automatic in view of the characteristics of the condenser. Then the initially small amount of current that passes through the resistance 39 is just enough lightly to hold the armature against the field member 3. This initial holding action is also favored by the residual magnetism in the field member 3 from the initial rush of current, although this residual magnetism is not relied upon alone for the purpose.

Thereafter the amount of current to coil 1 may be modulated to increase by manipulating the control member 41 further clockwise, thereby increasing the number of closed contacts 37 and shortening out more and more of the resistance 39. As the current flow increases, the magnetic field is increased in the field member 3, thus increasing the magnetic attraction for the armature 19. This amounts to increasing its mechanical pressure and therefore increasing the frictional holding action of the stationary frictional member 25 on the armature 19 and thus on the rotating parts. The modulation may also be decreased at will, depending upon retractive motion of the member 41. After all of the resistance has been reinserted, the last contact 35 opens, thus raising the circuit resistance to infinity which cuts off all current and all holding action by the coil 1. The springs then overcome the slight holding action of the residual magnetism and the device is reopened with a clear air gap re-established.

Exemplary values for the electrical constants of a practical brake are: battery 29—12 volts; coil 1—.1 henry inductance—3 ohms resistance; condenser 43—4,000 microfarads capacitance; resistance 39—50 ohms.

It will be observed that when the circuit is broken at the various contacts 37 or at switch 31, the condenser 43 serves also to absorb current caused by the electromotive force incident upon collapse of the field around coil 1. This avoids or reduces arcing at the various contacts mentioned. It should, however, be observed that the invention does not consist merely in the use of the condenser for this arc-reducing purpose since the much smaller condenser would satisfactorily fulfill such requirements. The present condenser 43 must be large enough not only to prevent the arcing as stated, but also to supply the coil 1 with a substantial value of transient current which is enough to generate a heavy enough flux field to draw over either the armature 19 (Fig. 2) or 58 (Fig. 3), the latter to be described.

An important advantage of the invention is that the simple initial closure of the first pair of contacts 35 is all that is needed in order to cause the desired first rush of current for drawing the armature over the air gap, along with the instant automatic decay of this current and the properly timed flow of a suitable amount of current which lightly holds the armature against the field member ready for modulation throughout a long subsequent modulating range. It will be noted that none of the modulating range is used up in cutting out resistance to obtain a first rush of current initially to draw over the armature, nor is any mechanical coordinator necessary for reinserting resistance prior to modulation.

Figure 3:
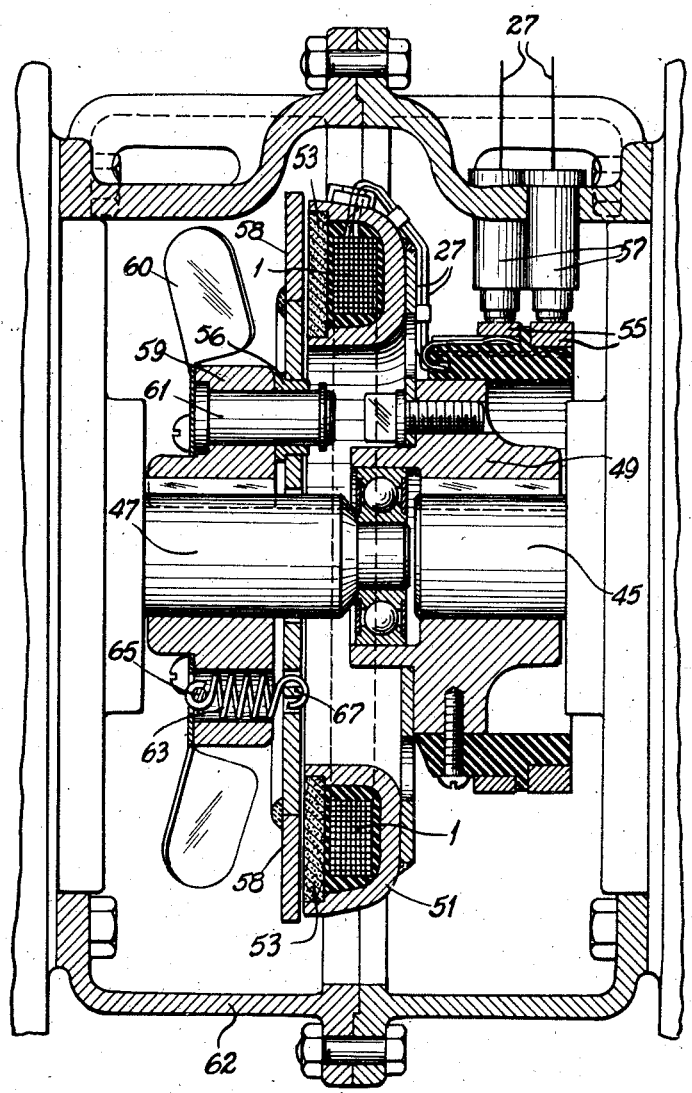

In Fig. 3 is shown an application of the invention to a friction clutch for gradually coupling rotary shafts 45 and 47. Keyed to shaft 45 is a hub 49 which carries the toric magnetic field member 51 in which is the coil 1 within a friction face ring 53. The hub 49 also carries insulated slip rings 55 with suitable connections to the coil 1, being engaged by brushes 57 which are located in series in the circuit 27.

The shaft 47 has keyed to it a spider 59 carrying pins (one of which is shown at 61) for slidably supporting the magnetic, combined armature and clutch plate 58. Bushings 56 facilitate sliding. Weak tension springs, one of which is shown at 63, react from suitable anchors 65 on the spider 59 to suitable anchors 67 on the armature 58 so as to bias the latter away from the field member 51 and establish a free air gap for normal open-clutch operation.

Supported upon the spider 59 are fan blades 60 which serve to circulate air through the casing 62 of the device for cooling purposes.

When it is desired to connect shafts 45 and 47 through friction engagement between the plate 58 and the field member 51, the circuit 27 is energized as above described in connection with the Fig. 2 form of the invention. The action is similar, the first rush of current causing the armature 58 promptly to be drawn across the air gap. Also, promptly thereafter the current decays. Then the residual magnetism and the small force due to the small amount of current passing through the whole resistance 39 lightly holds the clutch shut, ready for heavier closing pressure under modulating conditions.

Values for the various electrical parts of this last form of the invention may be analogous to those described in connection with Fig. 2. In this connection it is to be remembered that for different applications other values may need to be used and the above are simply exemplary. They show primarily the relatively large capacity required of the condenser 43.

In both forms of the invention the armature is shown as the axially movable member. This is of some advantage since it is the lighter of the two relatively rotary elements and therefore presents least inertia resistance against axial movement. However, the coil carrier could be made as the axially movable member.

Herein rotary movements between the frictional members may be referred to as tangential movements, and axial movements as normal movements, thus to include non-rotary frictional apparatus.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In friction apparatus, frictionally engageable armature and field members, one of which is movable tangentially with respect to the other, means for mounting one of said members for normal movement with respect to the other across a clearance, a field coil associated with the field member for generating a field for attracting said members across the clearance to effect engagement, a circuit for energizing said coil, a variable resistance in said circuit, a condenser connected in parallel with the resistance, sequentially operable means for gradually shunting out of the circuit portions of said resistance, said shunting means including means for inserting the condenser into the circuit preliminary to shunting out portions of said resistance.

2. In friction apparatus, frictionally engageable armature and field members, one of which is movable tangentially with respect to the other, means for mounting one of said members for normal movement with respect to the other across a clearance, a field coil associated with one of said members for generating a field for attracting said members across the clearance to effect frictional engagement, a circuit for energizing said coil, a variable resistance in said circuit, a condenser connected in parallel with the resistance, sequentially operable means for gradually shunting out of the circuit portions of said resistance, said shunting means including means for inserting the condenser into the circuit preliminary to shunting out portions of said resistance, the condenser being large enough positively and quickly to attract said members into engagement, and the total resistance being large enough that upon decay of transient current from the condenser the members are barely held together.

3. In friction apparatus, frictionally engageable armature and field members, one of which is relatively rotary with respect to the other, means for mounting one of said members for axial movement with respect to the other across a free air gap, means for lightly axially biasing said members apart to maintain said gap, a field coil associated with one of said members for generating a field for axially attracting said members across the free gap to effect frictional engagement, a circuit for energizing said coil, a variable resistance in said circuit, a condenser connected in parallel with the entire resistance, sequentially operable means for gradually shunting out of the circuit portions of said resistance, said shunting means including means for inserting the condenser into the circuit preliminary to shunting out portions of said resistance.

4. In friction apparatus, frictionally engageable armature and field members, one of which is relatively rotary with respect to the other, means for mounting one of said members for axial movement with respect to the other across a free air gap, means for lightly axially biasing said members apart to maintain said gap, a field coil associated with one of said members for generating a field for axially attracting said members across the free gap to effect frictional engagement, a circuit for energizing said coil, a variable resistance in said circuit, a condenser connected in parallel with the entire resistance, sequentially operable means for gradually shunting out of the circuit portions of said resistance, said shunting means including means for inserting the condenser into the circuit preliminary to shunting out portions of said resistance, the condenser being large enough positively and quickly to attract said members axially into engagement across the gap, and the total resistance being large enough that upon decay of the transient current from the condenser the members are barely held together against said separating bias.

5. Electromagnetically-controlled friction apparatus of the class described comprising a field member, a magnetic armature, said field member and armature being relatively movable in a direction to slide on one another if engaged, said field member and armature also having relative movement toward and away from one another, means biasing said members apart to provide non-rubbing clearance, said field member when energized being adapted to bring said members together for frictional driving engagement, an electric circuit for supplying current to said field member, current-modulating means in said circuit, means for connecting said modulating means into the circuit, a condenser by-passing said current-modulating means, and means for connecting said condenser into the circuit at the moment the current-modulating means is connected therein.

6. Electromagnetically-controlled friction apparatus of the class described comprising an electromagnetic field member, a magnetic armature, said field member and armature being mechanically relatively movable in a direction to slide on one another if engaged, said field member and armature also having relative movement toward and away from one another, means biasing said members apart to provide non-rubbing clearance, said field member when energized being adapted to bring said members together for frictional driving engagement and finally to lock, an electric circuit for supplying current to said field member, current-modulating means in said circuit, means for connecting said modulating means into the circuit, a condenser by-passing said current-modulating means, and means for connecting said condenser into the circuit at the moment the current-modulating means is connected therein, said condenser being of a capacity when energized temporarily to supply sufficient current to the field member to bring it and the armature together across said clearance.

7. Electromagnetically-controlled friction apparatus of the class described comprising an electro-magnetic field member, a magnetic armature, said field member and armature being mechanically relatively movable in a direction to slide on one another if engaged, said field member and armature also having relative movement toward and away from one another, means biasing said members apart to provide non-rubbing clearance, said field member when energized being adapted to bring said members together for frictional driving engagement and finally to lock, an electric circuit for supplying current to said field member, current-modulating means in said circuit, means for connecting said modulating means into the circuit, a condenser by-passing said current-modulating means, and means for connecting said condenser into the circuit at the moment the current-modulating means is connected therein, said condenser being of a capacity when energized temporarily to supply sufficient current to the field member to bring it and the armature together across said clearance, the amount of current initially flowing through said modulating means being only sufficient lightly to hold together the field member and armature, said modulating means being adapted thereafter controllably to increase and decrease the current so as to vary the pressure between said field member and the armature member over a range including complete locking under forces tending to bring about relative movement.

8. An electromagnetically-controlled friction brake comprising relatively rotary armature and field members, one of which is stationary, said members being mounted for relative axial movement toward and away from one another, said field member when sufficiently energized being adapted to bring said members together for frictional decelerating engagement, an electric circuit supplying current to said field member, a current-modulating variable resistance in said circuit, a condenser by-passing said current-modulating resistance, means for connecting said condenser into the circuit whenever the complete current-modulating means is connected therein and to remove both at will.

9. An electromagnetically-controlled friction brake comprising a rotary armature and fixed field member, the armature having axial movement toward and away from the field member, means biasing said armature from the field member to provide non-rubbing clearance, said field member when sufficiently energized being adapted to draw the armature to it for frictional decelerating engagement, an electric circuit supplying current to said field member, a current-modulating variable resistance in said circuit, a condenser by-passing said current-modulating means, and means for connecting said condenser into the circuit whenever the complete current-modulating means is connected therein and to remove both at will.

10. Electromagnetically-controlled clutch apparatus comprising a field member, an armature, said field member and armature being relatively rotary and relatively axially movable, said field member when energized being adapted to bring said members together axially for frictional driving engagement, an electric circuit for supplying current to said field member, resistance current-modulating means in the circuit, a condenser by-passing said resistance, and means for connecting said condenser into the circuit whenever the resistance-modulating means is connected therein.

11. Electromagnetically-controlled clutch apparatus comprising a field member, an armature, said field member and armature being relatively rotary and the armature being axially movable, means for biasing said armature from the field member to provide non-rubbing clearance, said field member when energized being adapted to bring said members together axially for frictional driving engagement, an electric circuit for supplying current to said field member, resistance current-modulating means in the circuit, a condenser bypassing said resistance, and means for connecting said condenser into the circuit whenever the resistance-modulating means is connected therein.

12. An electric control for electromagnetic clutches, brakes and the like comprising a circuit, a field coil in the circuit, a current modulator and condenser connected in series to the field coil and in parallel to one another, and control means for always connecting said condenser and modulator into the circuit simultaneously, said control means being adapted thereafter to modulate current through the circuit after the first rush of current from the condenser to the coil has decayed.

13. An electric circuit for electromagnetic clutches, brakes and the like comprising a circuit, a field coil in the circuit, a modulator resistance and condenser connected in series to the field coil and in parallel to one another, and control means for always connecting said condenser and the complete resistance of the modulator into the circuit simultaneously, said control means being adapted to cut modulating resistance out of and into the circuit after the first rush of current in the coil due to the condenser has decayed.

14. An electric circuit for electromagnetic clutches, brakes and the like comprising a circuit, a field coil in the circuit, a variable modulator resistance and condenser connected in series to the field coil and in parallel to one another, and control means for connecting said condenser and the complete resistance of the modulator into the circuit simultaneously, said control means being adapted thereafter to cut modulating resistance out of and into the circuit after the first rush of current from the condenser into the coil has decayed.

15. In friction apparatus, frictionally engageable armature and field members, one of which is movable tangentially with respect to the other, means for mounting one of said members for normal movement with respect to the other across an open air gap, a field coil associated with the field member for generating a field for attracting said members across the gap to effect friction engagement, a circuit for energizing said coil, a variable resistance in said circuit, a condenser connected in parallel with the resistance, sequentially operable means for gradually shunting out of the circuit portions of said resistance, said shunting means including means for automatically inserting the condenser and the resistance into the circuit at the same time but preliminary to shunting out portions of said resistance.

16. In friction apparatus, frictionally engageable armature and field members, one of which is movable tangentially with respect to the other, means for mounting one of said members for normal movement with respect to the other across an open air gap, a field coil associated with the field member for generating a field for attracting said members across the gap to effect friction engagement, a circuit for energizing said coil, a variable resistance in said circuit, a condenser connected in parallel with the resistance, sequentially operable means for gradually shunting out of the circuit portions of said resistance, said shunting means including means for automatically inserting the condenser and the resistance into the circuit at the same time but preliminary to shunting out portions of said resistance, said shunting means being adapted also inversely first to insert into the circuit portions of said resistance and after all of the resistance has been reinserted automatically to cut off from the circuit both the resistance and the condenser.

ANTHONY WINTHER.